United States Patent
Gieske et al.

(10) Patent No.: US 7,702,039 B2
(45) Date of Patent: Apr. 20, 2010

(54) RADIO RECEIVER FOR RECEIVING DIGITAL RADIO SIGNALS AND METHOD FOR RECEIVING DIGITAL RADIO SIGNALS

(75) Inventors: Kurt Gieske, Giesen/Gross Foerste (DE); Gunnar Nitsche, Radebeul (DE)

(73) Assignee: Robert Bosch GmbH, Stuttgart (DE)

( * ) Notice: Subject to any disclaimer, the term of this patent is extended or adjusted under 35 U.S.C. 154(b) by 1751 days.

(21) Appl. No.: 10/276,760

(22) PCT Filed: May 10, 2001

(86) PCT No.: PCT/DE01/01776

§ 371 (c)(1),
(2), (4) Date: Oct. 1, 2003

(87) PCT Pub. No.: WO01/89137

PCT Pub. Date: Nov. 22, 2001

(65) Prior Publication Data

US 2004/0058662 A1    Mar. 25, 2004

(30) Foreign Application Priority Data

May 17, 2000    (DE) ................................ 100 24 267

(51) Int. Cl.
H04L 27/00    (2006.01)
(52) U.S. Cl. ........................ 375/324; 375/340
(58) Field of Classification Search ................. 375/371, 375/316, 321, 322, 306, 326, 355, 357, 354, 375/340, 324; 341/61, 144
See application file for complete search history.

(56) References Cited

U.S. PATENT DOCUMENTS 4,317,221 A    2/1982   Toya

| 4,764,730 A | * | 8/1988 | Miyo et al. | 329/307 |
| 5,119,093 A | | 6/1992 | Vogt et al. | |
| 5,150,383 A | * | 9/1992 | Misaizu et al. | 375/340 |
| 5,365,468 A | * | 11/1994 | Kakubo et al. | 708/313 |
| 5,387,913 A | | 2/1995 | Park et al. | |

(Continued)

FOREIGN PATENT DOCUMENTS

DE    4 326 427    2/1995

(Continued)

OTHER PUBLICATIONS

J. Weller et al., "Forward looking sensor system for future automotive safety.", VDI Berichte Nr. 1471, 1999 (Abstract).

(Continued)

*Primary Examiner*—Emmanuel Bayard
(74) *Attorney, Agent, or Firm*—Kenyon & Kenyon LLP

(57) ABSTRACT

A radio receiver for receiving digital radio signals and a method for receiving digital radio signals are used for undertaking the conversion of digital audio signals to a preset clock pulse rate or clock pulse regulation. The digital asynchronous sampling rate conversion has an input buffer, a control system, a coefficient memory, an accumulator and an interpolator. The output signals of the sampling rate conversion are either passed on for playback or switched to a multimedia bus. The radio receiver and the method are suitable for also converting digital audio signals from sound carriers to a preset clock pulse rate.

9 Claims, 2 Drawing Sheets

U.S. PATENT DOCUMENTS

| | | | |
|---|---|---|---|
| 5,425,057 A | | 6/1995 | Paff |
| 5,457,456 A | * | 10/1995 | Norsworthy ................. 341/61 |
| 5,504,785 A | * | 4/1996 | Becker et al. ................ 375/344 |
| 5,535,433 A | * | 7/1996 | Kurokawa et al. ............ 455/79 |
| 5,588,025 A | * | 12/1996 | Strolle et al. ................ 375/316 |
| 5,617,088 A | * | 4/1997 | Yasuda ........................ 341/61 |
| 5,640,698 A | | 6/1997 | Shen et al. |
| 5,726,818 A | * | 3/1998 | Reed et al. ..................... 360/51 |
| 5,790,615 A | | 8/1998 | Beale et al. |
| 5,809,009 A | * | 9/1998 | Matsuoka et al. ........... 370/206 |
| 5,812,336 A | * | 9/1998 | Spurbeck et al. .............. 360/51 |
| 5,825,241 A | | 10/1998 | Beale et al. |
| 5,862,189 A | | 1/1999 | Huisken et al. |
| 5,916,301 A | | 6/1999 | Rothacher |
| 5,943,371 A | | 8/1999 | Beale et al. |
| 6,000,834 A | * | 12/1999 | Duan ........................ 708/313 |
| 6,005,640 A | * | 12/1999 | Strolle et al. ................ 348/726 |
| 6,061,410 A | | 5/2000 | Linz |
| 6,128,357 A | * | 10/2000 | Lu et al. ..................... 375/355 |
| 6,208,671 B1 | * | 3/2001 | Paulos et al. ................ 370/545 |
| 6,226,758 B1 | * | 5/2001 | Gaalaas et al. ............. 713/600 |
| 6,278,864 B1 | * | 8/2001 | Cummins et al. ............. 455/73 |
| 6,492,927 B2 | * | 12/2002 | Fukami ....................... 341/144 |
| 6,526,325 B1 | * | 2/2003 | Sussman et al. ............... 700/94 |
| 7,050,419 B2 | * | 5/2006 | Azenkot et al. ............. 370/347 |
| 2002/0170968 A1 | * | 11/2002 | Blake et al. ............ 235/462.11 |
| 2005/0239398 A1 | * | 10/2005 | Lai ........................... 455/3.02 |

FOREIGN PATENT DOCUMENTS

| | | |
|---|---|---|
| DE | 38 51 440 | 3/1995 |
| DE | 692 21 971 | 3/1998 |
| EP | 0 401 562 | 12/1990 |
| EP | 0 394 257 | 9/1994 |
| EP | 0 525 969 | 9/1997 |
| EP | 0 818 904 | 1/1998 |
| EP | 0 926 857 | 6/1999 |
| EP | 0 987 864 | 3/2000 |
| EP | 1 096 715 | 5/2001 |
| EP | 1 096 716 | 5/2001 |
| EP | 1 130 833 | 9/2001 |

OTHER PUBLICATIONS

G. Ascheid et al: An all Digital Receiver Architecture for Bandwidth Efficient Transmission at High Data Rates, IEEE Transactions on Com., vol. 37, No. 8, Aug. 1989, p. 804 ff.

J.A. Huisken et all: Specification, Partitioning and Design of a DAB Channel Decoder, VLSI Signal Processing, VI, 1993, pp. 21 to 29.

A. Straub, "Digitale Audio-Verarbeitung" Radio Fernsehen Elektronik, VEB VERLAG TEKNIK, Berlin, Federal Republic of Germany, Bd. 42, Nr. 1, 1993.

T. Pollet et al., "Synchronization with DMT Modulation," IEEE Communications Magazine, IEEE Service Center, Pascataway, NJ, United States of America, Bd. 37, Nr. 4, Apr. 1999.

H. Nogami, "A Frequency and Timing Period Acquisition Technique for OFDM Systems," IEICE Transactions on Communications, Institute of Electronics Information and Comm. Eng., Tokyo, Japan, Bd. E79-B, Nr. 8, Aug. 8, 1996.

* cited by examiner

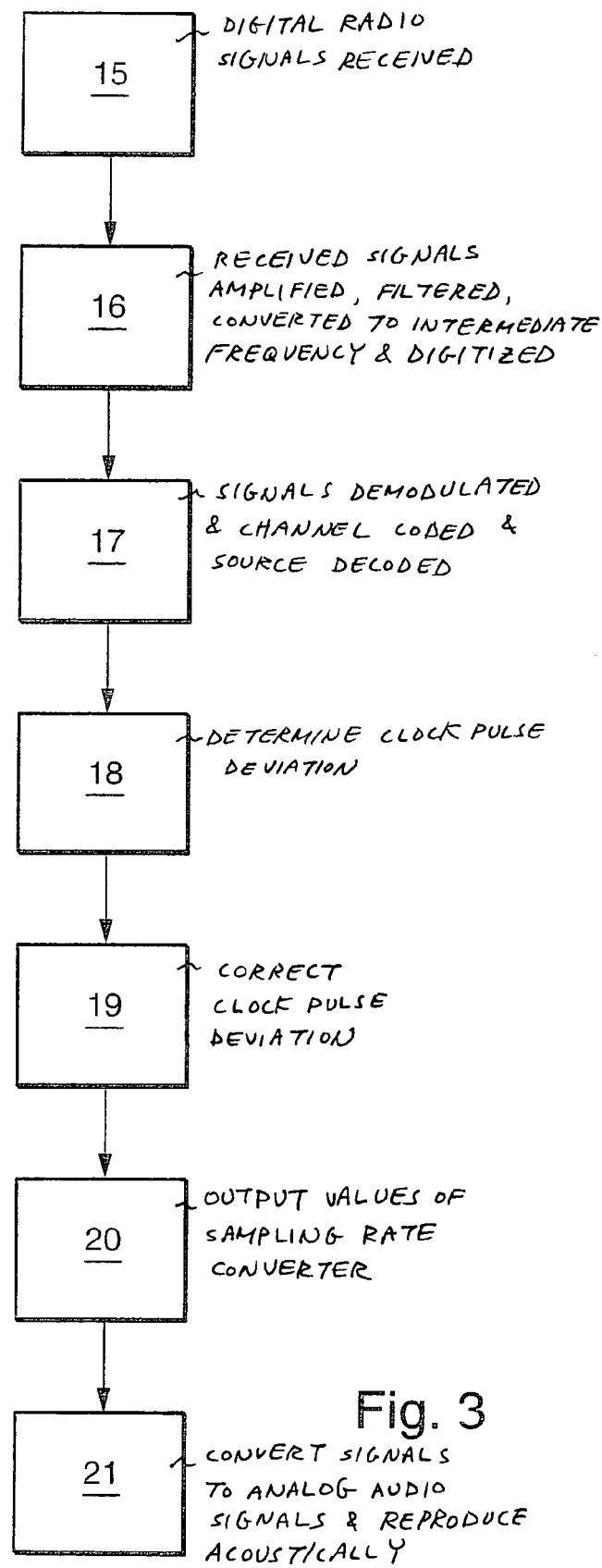

US 7,702,039 B2

RADIO RECEIVER FOR RECEIVING DIGITAL RADIO SIGNALS AND METHOD FOR RECEIVING DIGITAL RADIO SIGNALS

FIELD OF THE INVENTION

The present invention relates to a radio receiver for receiving digital radio signals and a method for receiving digital radio signals.

BACKGROUND INFORMATION

In digital radio broadcast systems for wireless transmission, such as DAB (digital audio broadcasting) or DRM (digital radio mondial), in the transmitter an audio source is sampled at a sampling rate of usually 48 kHz or 24 kHz. Pulse code modulation is used. After that, source coding for data reduction and channel coding for fault protection are performed in the transmitter. The digital radio signals thus created are then transmitted to the receivers, using an antenna. The receivers have to reproduce the audio signals at the clock pulse at which the transmitters work, otherwise audible faults may come about under certain circumstances, since there will be either too few or too many sampling values if the transmitters and the receivers are working at different clock pulses. This may lead to crackling sounds. In order to produce clock pulse regulation, in the usual receivers, a voltage-controlled oscillator is used, that is, an oscillator whose frequency is tuned by an applied voltage.

European Published Patent Application No. 1 096 716 describes a sampling rate conversion in the case of an overflow or underflow of a buffer. European Published Patent Application No. 1 096 715 also describes such a sampling rate conversion in a radio receiver. European Published Patent Application No. 0 401 562 describes a configuration for converting a signal having a first sampling rate into a signal having a second sampling rate. In this context, a digital filter is used for this conversion, in which coefficients are formed as a function of the ratio of the sampling rates.

SUMMARY

By contrast, the radio receiver, according to the present invention, for receiving digital radio signals and the method, according to the present invention, for receiving digital radio signals, converts the audio signals from the sampling rate of the transmitter to the sampling rate of the receiver, using a digital sampling rate conversion. This avoids having too many or too few sampling values present.

For this, a fixed-frequency oscillator may be used, which is configured simply and which may be used at the same time for frequency generation for the analog front-end, the high frequency receive section. A fixed-frequency oscillator does not require painstaking calibration as does a voltage-controlled oscillator.

Besides the clock pulse regulation for the sampling rate of the digital radio signals received, a conversion is also possible of digital audio signals to another sampling rate, which may, for example, be preset by a multimedia bus, using the radio receiver according to the present invention. Along with that, it is also possible to use a single digital to analog converter for the audio signals, before they are analog amplified and reproduced using a loudspeaker. One digital to analog converter may be used for one frequency. In this connection, digital audio signals may be converted to a preset sampling rate.

The digital asynchronous sampling rate converter is configured so that it has an input buffer, a control system, a coefficient memory and an accumulator as well as an interpolator, so that the radio receiver according to the present invention is made by simple and therefore rapid hardware circuitry.

In addition, in the case of DAB, the clock pulse deviation may be ascertained from the digital radio signals, with the aid of a TFPR symbol. The TFPR symbol makes it possible to determine the frequency offset.

The buffered digital audio signals may be submitted to a setpoint regulation for conducting a sampling rate adjustment.

The output values of the digital asynchronous sampling rate converter may be calculated with the aid of interpolation and nodes. The nodes may be calculated using a preset number of filter coefficients, the polyphases, whereas the remaining output values may be obtained by a simple, linear interpolation between the nodes. This is a simple method for the sampling rate conversion.

The filter coefficients may be optimized before being loaded into the coefficient memory, in that, for an interpolated signal and a corresponding ideal output signal, the quadratic error for a preset frequency range is minimized. The signal-to-noise ratio at minimum filter length for the asynchronous sampling rate converter may be optimized.

Exemplary embodiments of the present invention are represented in the drawings and are explained in detail in the following description.

BRIEF DESCRIPTION OF THE DRAWINGS

FIG. 3 is a flow diagram of the method according to the present invention for receiving digital radio signals.

DETAILED DESCRIPTION

In digital radio systems, synchronization of the digital radio signals of the receiver with the transmitter is necessary in order to ensure a fault-free reproduction of the audio signals. This is especially the case in wireless digital data transmission, as is used for the broadcast systems DAB (digital audio broadcasting) and DRM (digital radio mondial). In the method according to the present invention, the synchronization is performed purely digitally, and the audio signals are converted digitally from the transmitter sampling rate to the receiver sampling rate.

DAB and DRM are digital radio transmission methods which in each case use the orthogonal frequency division for transmission. The transmission of the data takes place in frames, it being possible also to transmit other data such as multimedia data, besides digital audio data. For the audio data, both source coding for data reduction and channel coding for fault protection are performed.

Because of aging and temperature influences, the oscillator frequency in a radio receiver will fluctuate or even drift. If received audio signals are sampled at a faulty sampling rate, the result will be either too many audio data or too few. Both situations may lead to audible faults.

Therefore, according to the present invention, a fixed-frequency oscillator is used in the radio receiver according to the present invention, so as to undertake a clock pulse regulation of the received digital radio signals or a clock pulse adjustment, with the aid of a digital, asynchronous sampling rate converter. The clock pulse adjustment may also be undertaken with digital audio signals, which may be reproduced using a sound carrier. This clock pulse regulation is undertaken after audio decoding of the digital audio signals.

Figure 1:
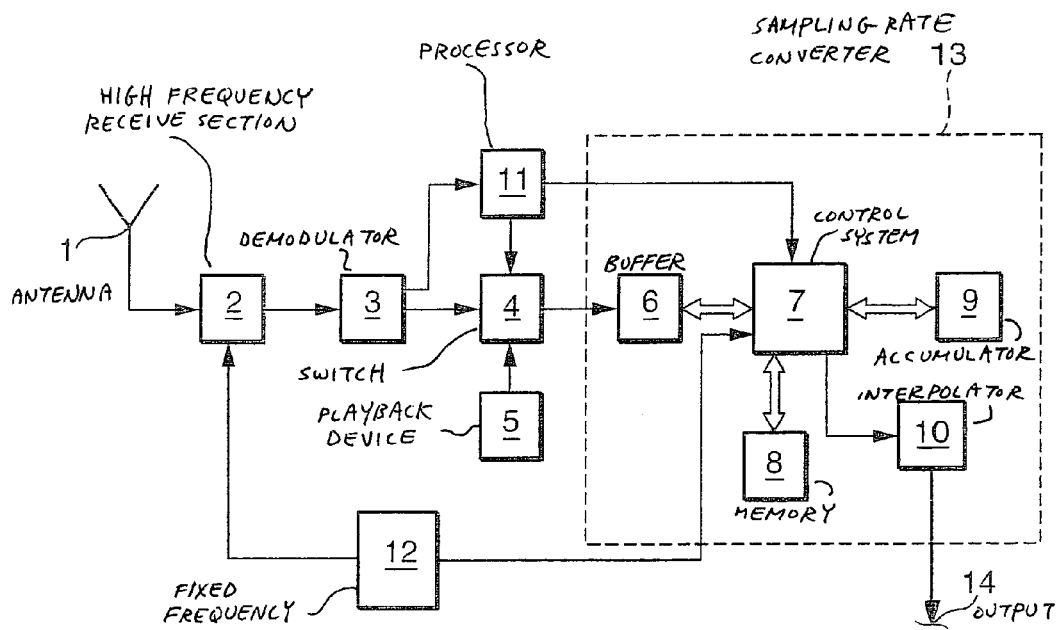
FIG. 1 is a block diagram of a radio receiver according to the present invention.

FIG. 1 illustrates the radio receiver according to the present invention for receiving digital radio signals, as a block diagram. This is where the clock pulse adjustment is undertaken using the TFPR symbol (the phase reference symbol), since this is where a DAB radio receiver is illustrated.

An antenna 1 for receiving the digital radio signals is connected to a first input of a high frequency receive section 2 (analog front-end). A fixed-frequency oscillator 12 is connected to a second input of high frequency receive section 2. A demodulator 3 is connected to an output of high frequency receive section 2.

A first data output of demodulator 3 leads to a first data input of a switch 4. A second data output of demodulator 3 leads to a data input of processor 11. A playoff device for sound carrier 5 is connected to the second data input of switch 4. A first data output of processor 11 is connected to a control input of switch 4. A second data output of processor 11 leads to a first data input of a control system 7.

A buffer 6, control system 7, a coefficient memory 8, an accumulator 9 and an interpolator 10 together form the asynchronous digital sampling rate converter 13. A data output of switch 4 leads to buffer 6. Buffer 6 is connected to a first data input/output of control system 7 via a data input/output. Control system 7 is connected to coefficient memory 8 via a second data input/output. A signal from the second data output of fixed-frequency oscillator 12 leads to a second data input of control system 7. A third data input/output of control system 7 leads to a data input of accumulator 9. A data output of control system 7 is connected to a data input of interpolator 10. Output signals 14 of asynchronous digital sampling rate converter 13 are present at the data output of interpolator 10.

The digital radio signals received using antenna 1 are amplified by high frequency receive section 2, are filtered and converted to a lower intermediate frequency. In addition, the converted radio signals are then digitized in high frequency receive section 2. This may be done alternatively in demodulator 3, too, as well as in the digital section.

Demodulator 3 demodulates the digital radio signals and performs a fault correction using channel coding. In addition, demodulator 3 performs the source coding. Demodulator 3 transmits the demodulated audio signals to switch 4 via its second data output. Switch 4 switches either audio signals obtained from received radio signals, or audio signals originating with a sound carrier, and thus generated using playback device 5, through to digital asynchronous sampling rate converter 13. The switching of switch 4 takes place via the control input by processor 11. In this context, processor 11 is connected to an input device via which the user says whether he/she wants to listen to digital radio or sound carrier signals.

The second data output of demodulator 3 leads to processor 11. Thus, in the case of DAB, The TFPR symbol is transmitted from the DAB frame to processor 11, so that processor 11 may calculate the clock pulse deviation from the TFPR symbol. This is performed such that, by using the TFPR symbol, the time deviation between two null symbols in the transmitter and two null symbols in the receiver may be determined. The time apart is determined in the receiver, using a counter which is coupled to fixed-frequency oscillator 12. With the aid of this time deviation, the frequency deviation of fixed-frequency oscillator 12 may then be calculated, because the time interval between two null symbols is preset, and a deviation between the measured time interval and the preset time interval may only be caused by the receiver, and thus by fixed-frequency oscillator 12. In other digital radio transmission methods, equivalent symbols are used for determining the clock pulse deviation. Alternatively, the buffer filling level of buffer 6 may be used for regulation. This is illustrated in FIG. 3.

The audio stream switched through by switch 4 to input buffer 6 of asynchronous digital sampling rate converter 13 is first temporarily stored in input buffer 6. Control system 7 selects a coefficient set from coefficient memory 8 and audio data for this from buffer 6. With these, then, the output values are calculated. The length of the coefficient set determines the number of audio data taken from buffer 6.

In this context, using accumulator 9, a coefficient set and an interpolation factor are determined for the linear interpolation. This interpolation is then performed, using interpolator 10. Accumulator 9 is incremented by a value, which results from the regulation, during the calculation of an output value. This is called a digital oscillator, or, in English, a numerically controlled oscillator. This value is then passed on by control system 7 to interpolator 10. In response to the conversion of the frequency $F_{in}$ to $F_{out}$, on the average, the following value S is given for the accumulator offset, N indicating the accumulator width.

$$S = 2^N \cdot \left( \frac{F_{in}}{F_{out}} \right)$$

The interpolation subdivides into two steps. Altogether, $2^N$ nodes may be calculated between two input values. $2^1$ nodes may be calculated directly with the aid of the polyphases, that is, the filter coefficients. If the node to be calculated lies between two polyphases, a linear interpolation is performed. The interpolation factor then has the word length $2^{N-1}$.

The filter coefficients, which are loaded from coefficient memory 8, may be optimized, considering the linear interpolation, so that an optimum signal-to-noise margin is achieved at minimum filter length of the asynchronous digital sampling rate converter. The coefficients are optimized so that the average quadratic error between the interpolated continuous signal and the ideal output signal is minimized over a predefined frequency range. This optimization is performed before the operation of the radio receiver according to the present invention. Interpolations of a higher order may be used for reducing the number of the filter coefficients, the same accuracy being achieved. This means a greater calculating expenditure.

For each output value, interpolator 10 calculates two filter values, the output value then being calculated by a linear interpolation of the polyphase results. Output values 14 are then either converted to analog audio signals, using a digital to analog converter, in order then to be amplified, using an audio amplifier, and finally to be reproduced acoustically, using a loudspeaker or a loudspeaker system. Alternatively, it is possible to transmit the digital output signals of the asynchronous digital sampling rate converter 13 to a multimedia bus, in order then to transmit them to an acoustical reproduction unit or a computer or a memory. In this context, it is then necessary for digital asynchronous sampling rate converter 13 to convert the audio signals to the clock pulse of the multimedia bus. This value is then preset for control system 7 by processor 11. Using fixed-frequency oscillator 12, the required frequency for the conversion is derived. This is done by frequency dividing.

Fixed-frequency oscillator 12 makes the frequency available, both for high frequency receive section 2 and for sampling rate converter 13.

Figure 2:
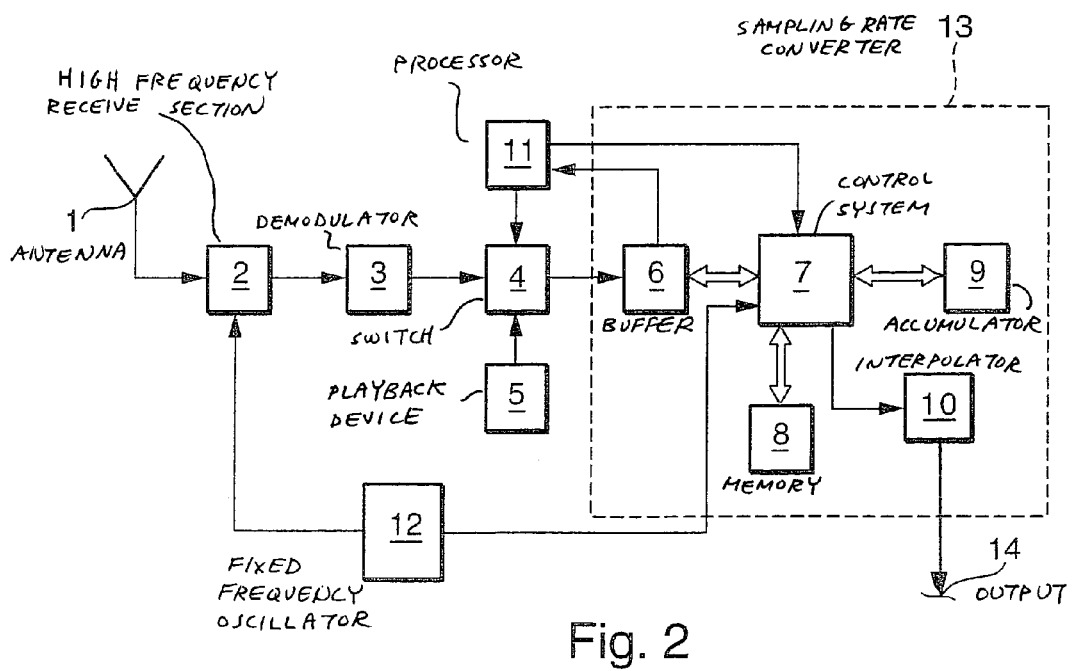
FIG. 2 is a second block diagram of a radio receiver according to the present invention.

FIG. 2 illustrates a second block diagram of the radio receiver according to the present invention for digital radio signals. This is where adjustment to the clock pulse of the receiver by regulating input buffer 6 is performed.

Antenna 1 is connected to the first input of high frequency receive section 2. Fixed-frequency oscillator 12 is connected to the second input of high frequency receive section 2. Demodulator 3 is connected to the output of high frequency receive section 2. The data output of demodulator 3 leads to the first data input of switch 4. The playback device for sound carriers is connected to the second input of switch 4. The first data output of processor 11 is connected to a control input of switch 4. The data output of switch 4 leads to input buffer 6. Input buffer 6, control system 7, coefficient memory 8, accumulator 9 and interpolator 10 are the components of the digital asynchronous sampling rate converter 13.

A data input of processor 11 is connected to a data output of input buffer 6, to determine the buffer filling level. The second data output of processor 11 leads to the first data input of control system 7. Input buffer 6 is connected to first data input/output of control system 7. Fixed-frequency oscillator 12 is connected to the second data input of control system 7. Coefficient memory 8 is connected to the second data input/output of control system 7. Accumulator 9 is connected to the third data input/output of control system 7. Interpolator 10 is connected to the data output of control system 7. The output data of interpolator 10 lead to output 14 of sampling rate converter 13, to which, as described above, either a multimedia bus or a digital to analog converter is connected.

The manner of functioning of the components of the radio receiver is as described for FIG. 1, except for the regulation of the sampling rate.

The regulation of input buffer 6, and thus of the sampling rate, takes place in that the input buffer filling level, the actual value, is used as the regulating variable of processor 11. In this context, this is regulated to a setpoint value by control system 7 taking data from input buffer 6. With the aid of a first order digital regulator, a new value may be calculated for accumulator 9 at suitable time intervals. This regulation is performed when the frequency deviation is not calculated using the TFPR symbol or another synchronization symbol.

The coefficients of the regulation may be set up so that the asymptotic boundary case is reached, so as to achieve optimum regulation with minimum transient phenomena. In this context, the regulation may be implemented both in hardware and in software. In this instance, the regulation is implemented in software which runs on processor 11. Alternatively, it is possible to perform the regulating algorithm in hardware.

In FIG. 3, the method of the present invention for receiving digital radio signals is represented as a flow chart. In method step 15, the digital radio signals are received. In method step 16, the received radio signals are amplified, filtered, converted to an intermediate frequency and digitized. In method step 17, the radio signals are then demodulated and submitted to channel coding and source decoding. In method step 18, the clock pulse deviation between the received radio signals and the frequency of the fixed-frequency oscillator is determined. In method step 19, this clock pulse deviation is corrected with the aid of the asynchronous digital sampling rate converter 13. In method step 20, the output values of digital asynchronous sampling rate converter 13 are output. Finally, in method step 21, the decoded audio signals are converted to analog audio signals, are amplified and are reproduced acoustically. Alternatively, it is possible at this point to convert the converted audio data to a multimedia bus, for example to the MOST bus.

In this connection, it is alternatively possible that, instead of received radio signals, signals from digital sound carriers may also be used. The clock pulse deviation may be determined by a setpoint setting, or, in the case of DAB, by the evaluation of the TFPR symbol or by a preset clock pulse value.

What is claimed is:

1. A radio receiver configured to receive and process digital radio signals, comprising:

a demodulator configured to demodulate the digital radio signals and to ascertain digital audio signals from the demodulated radio signals, a means for decoding, amplifying and reproducing acoustically the digital audio signals, a fixed-frequency oscillator and a digital asynchronous sampling rate converter, a processor configured to ascertain a clock pulse deviation between the received radio signals and a frequency of a fixed-frequency oscillator, the receiver connected to a multimedia bus, wherein the digital asynchronous sampling rate converter is configured to buffer the digital audio signals and perform a digital asynchronous sampling rate conversion to correct the clock pulse deviation between the received radio signals and the frequency of the fixed-frequency oscillator, wherein output values of the digital asynchronous sampling rate conversion are calculated using filter coefficients and the buffered digital audio signals.

2. The radio receiver according to claim 1, wherein the digital asynchronous sampling rate converter includes an input buffer, a control system, a coefficient memory, an accumulator and an interpolator.

3. The radio receiver according to claim 1, wherein an input of the digital asynchronous sampling rate converter is connected to an output of at least one device configured to playback sound carriers.

4. A method for receiving and processing a wirelessly transmitted digital radio signals, comprising:

demodulating the received radio signals;

ascertaining digital audio signals from the demodulated radio signals;

decoding, amplifying and reproducing acoustically the digital audio signals;

ascertaining a clock pulse deviation between the received radio signals and a frequency of a fixed-frequency oscillator;

buffering the digital audio signals in a digital asynchronous sampling rate conversion, wherein the digital asynchronous sampling rate conversion is used to correct the clock pulse deviation between the received radio signals and a frequency of a fixed-frequency oscillator; and calculating output values of the digital asynchronous sampling rate conversion using filter coefficients and the digital audio signals.

5. The method according to claim 4, wherein the clock pulse deviation is corrected to a preset clock pulse by a clock pulse regulation using the digital asynchronous sampling rate conversion.

6. The method according to claim 4, wherein the clock pulse deviation is ascertained from a TFPR symbol.

7. The method according to claim 4, further comprising regulating a number of the buffered digital audio signals to a setpoint value.

8. The method according to claim 4, wherein the output values are calculated in the calculating step using interpolation and nodes.

9. The method according to claim 4, further comprising optimizing the filter coefficients by minimizing an average quadratic error between an interpolated continuous signal and a corresponding ideal output signal for a preset frequency range.

* * * * *